June 21, 1966 W. VOLK ETAL 3,257,198
BENEFICIATION OF ORE
Filed Dec. 21, 1962
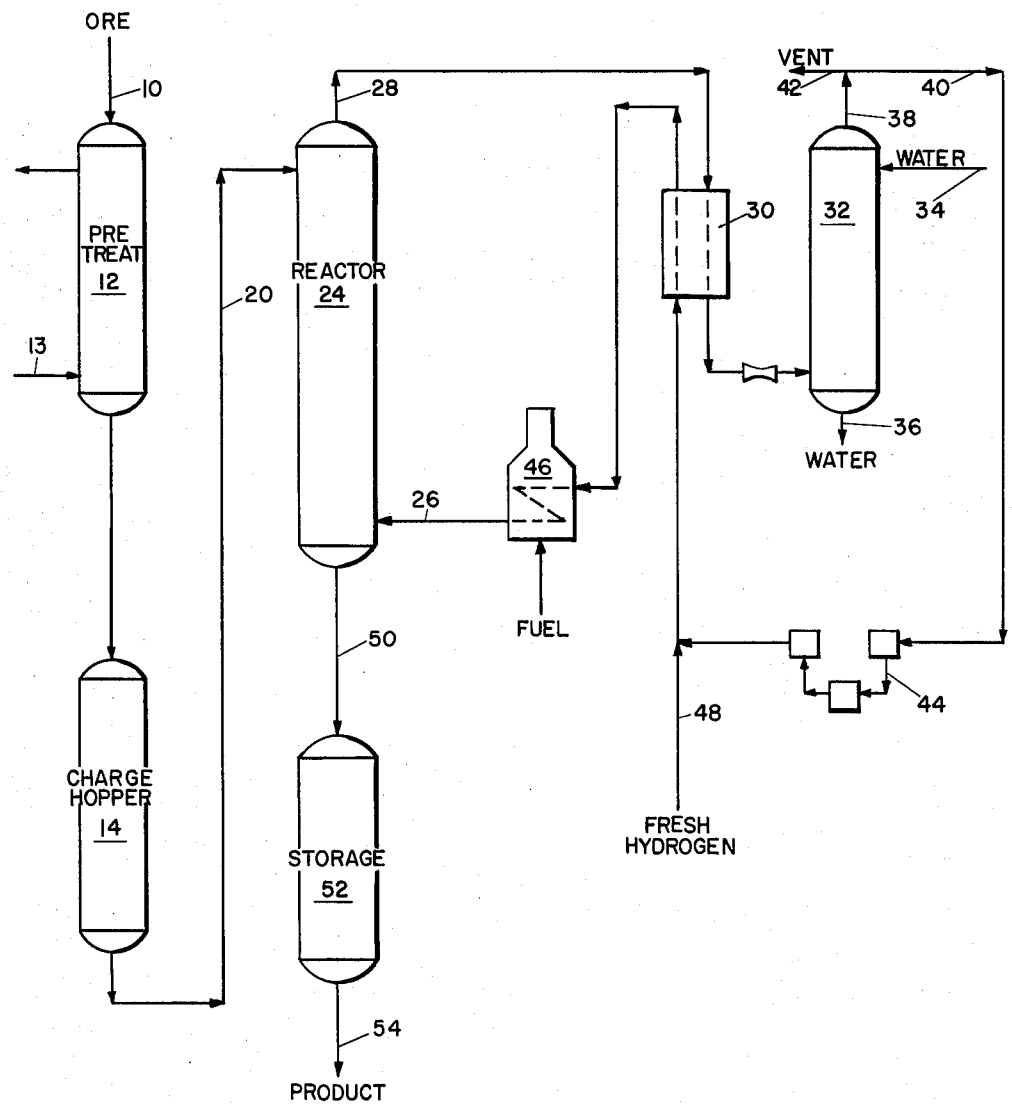
INVENTORS
WILLIAM VOLK
CARL L. WEBER
BY Nathaniel Ely
ATTORNEY

3,257,198
BENEFICIATION OF ORE
William Volk, Princeton, N.J., and Carl L. Weber, Warminster, Pa., assignors to Hydrocarbon Research, Inc., New York, N.Y., a corporation of New Jersey
Filed Dec. 21, 1962, Ser. No. 246,542
1 Claim. (Cl. 75—31)

This invention relates to improvements in the reduction of iron oxide containing ores by a fluidized direct reduction process, and is more particularly an improvement on the invention described in the Keith et al. patent, 2,900,246. It is, furthermore, an improvement on the process described in the co-pending application of Johnson et al., Serial No. 227,266, filed October 1, 1962.

In the reduction of certain iron oxide complexes, as for example, iron ores containing mixed oxides such as ilmenite, laterites, and certain silicate ores, it has been found substantially impossible to reduce the iron oxide under non-sintering temperatures regardless of the pressure and purity of hydrogen. In a particular observation, for example, we have found that MacIntyre ilmenite could only be 40% reduced with hydrogen at 1300° F. after four hours.

After extended testing and further study of the problem, it was reasoned that ore of this type, which has a relatively high ratio of ferrous oxide to ferric oxide, tends to hinder the reaction of the hydrogen on the oxides.

We have subsequently found that it is possible to effectively reduce mixed iron oxide ores of this type with hydrogen, and it is the object of the invention to so reduce such ores under relatively effective as well as economical operations.

More particularly, our invention is further described in connection with the attached drawing illustrative of a preferred form of embodiment thereof, such drawing being a schematic flow diagram of the principal pieces of apparatus in an ore reduction process.

The particular apparatus hereinafter described is primarily adapted to treat a complex oxide ore of the nature of MacIntyre ilmenite, which has in the order of from 5:1 to 10:1 ratio of ferrous oxide to ferric oxide, so that such ore may be reduced to the order of 85% to 95% with respect to the iron oxides.

Preferably, such an ore is preliminarily dried and ground so that about 10% passes 325 mesh and all passes 20 mesh. While this step is not essential for certain naturally granular ores such as ilmenite sands from India or New Zealand, it is necessary to establish a fineness that will permit fluidization as hereinafter described.

In accordance with our invention, this ore at 10 is preferably passed through a pretreat chamber 12 wherein the ore is preliminarily oxidized with air entering at 13, and preferably maintained at a temperature in the order of 1300° F. to 2000° F. This air is preferably blown up through the ore in pretreat chamber 12 at a velocity to fluidize the particles or alternatively, the pretreat chamber 12 may be a kiln. This extremely hot air materially changes the ratio of ferrous oxide to ferric oxide and makes the ore amenable to the subsequent direct reduction as hereinafter described. Other oxygen containing oxidizing gases such as oxygen can be used for this purpose.

In at least one instance, after oxidizing the ore for a period of approximately four hours at a temperature as low as 1300° F., it was found thereafter that the ore could be virtually completely reduced in hydrogen at 1300° F. in four hours, whereas without the preoxidation, the ore could only be reduced about 40% under similar conditions.

The reduction is accomplished by discharging ore from the charge hopper 14 through line 20 into the reactor 24, which may be of the type generally shown in the Keith et al. patent, 2,995,426. Such a device is customarily a vertical reactor subdivided into one or more vertically disposed beds of ore through which the reducing gas enters as shown at 26, and passes upwardly in a fluidized or suspension system for reaction with the oxides of the iron. Under the temperature and pressure conditions found optimum in iron oxide reduction, as hereinafter specified, it is noted that the titanium dioxide of ilmenite ore is not reduced as more particularly pointed out in the aforesaid application, Serial No. 227,266.

In the present process, the hydrogen velocity through the bed in reactor 24 is in the order of 1.0 to 1.5 feet per second, and the temperature is preferably in the order of 1200 to 1400° F., and at a pressure normally between 200 and 450 p.s.i.g. The hydrogen purity, as pointed out in the Keith et al. patent, 2,900,246, should be at least 85% and with a partial pressure of at least 150 p.s.i.

The effluent of unreacted hydrogen and water vapor removed overhead at 28 passes through a suitable heat exchanger 30 and into water scrubbing tower 32 supplied with water to cool and condense the water which is removed at 36. The hydrogen which passes overhead at 38 is primarily recycled through the line 40 as hereinafter described although a part may be purged from time to time at 42 to prevent build-up of undesired gaseous products.

The recycled hydrogen in line 40 is preferably recompressed at 44, passed through the heat exchanger 30 to pick up heat from the effluent stream 28 and further heated in heater 46. This gas thus becomes the principal part of the feed in line 26 to the reactor 24. Fresh make-up hydrogen may be added at 48. Recycle ratios of 10 parts of repurified hydrogen to 1 part of fresh hydrogen are customary.

Under normal circumstances, as described in the above mentioned Keith patent, 2,900,246, the hydrogen accomplishes a reduction of the iron oxide as it passes through the bed of ore. We have observed that this reduction on ore of mixed iron oxides does not materially affect the other metallic oxides. In the particular case herein, the reduced ore, which is at least 85% reduced with respect to the iron oxides, is removed through the discharge line 50 to a high pressure product storage vessel 52 and thence through line 54 as product for further use and separation of the non-ferrous values from the ferrous values if desired.

The preliminary reduction of mixed oxide ores by hydrogen in a fluidized bed under super-atmospheric pressure and at temperatures below 1400° F. has so reduced the iron oxides to metallic iron without affecting the titanium dioxide as to permit further separation of the reduced iron from the unreduced metallic oxides for either the recovery of the iron, or the metallic oxides, as for example, $TiO_2$, or both.

While we have shown and described a preferred form of embodiment of our invention, we are aware that modifications may be made thereof and we, therefore, desire a broad interpretation of our invention within the scope and spirit of the description herein and of the claim appended hereinafter.

We claim:

The process of beneficiating an iron oxide complex from the class of ilmenite, laterite and silicate ores having ferrous oxide and ferric oxides in the proportion of ferrous oxide to ferric oxide in the order of from five to ten to one and having non-ferrous values which comprises the steps of:

(a) oxidizing the complex at substantially atmospheric pressure and within the temperature range of 1300°

F. to 2000° F. for a period to reduce the proportion of ferrous oxides to ferric oxides, to less than one;
(b) reducing the oxidized complex with hydrogen of at least 85% purity, and at a temperature in the order of 1200° to 1400° F. and at a pressure between 200 and 450 p.s.i.g. by passing the hydrogen upwardly through a bed of the oxidized complex at a velocity in the order of 1.0 to 1.5 feet per second to fluidize the complex;
(c) the time of reduction being limited to that sufficient to substantially completely reduce the iron oxides to metallic iron without affecting the non-ferrous values;
(d) and separating the metallic iron from the non-ferrous values.

References Cited by the Examiner

UNITED STATES PATENTS

| | | |
|---|---|---|
| 2,339,808 | 1/1944 | Ravnestad et al. |
| 2,900,246 | 8/1959 | Keith et al. _____ 75—26 |
| 2,991,172 | 7/1961 | Hahn et al. _____ 75—26 |
| 3,105,755 | 10/1963 | Green _____ 75—1 |
| 3,105,756 | 10/1963 | Green _____ 75—1 |

BENJAMIN HENKIN, *Primary Examiner.*